Dec. 24, 1935. A. M. ROSSMAN Re. 19,797

ELECTRICAL SWITCHING STATION

Original Filed Oct. 17, 1923 6 Sheets-Sheet 1

Witness:

William P. Kilroy

Inventor:

Allen M. Rossman

Brown Jackson Boettcher & Dienner

Attys.

Dec. 24, 1935. A. M. ROSSMAN Re. 19,797
ELECTRICAL SWITCHING STATION
Original Filed Oct. 17, 1928 6 Sheets-Sheet 2
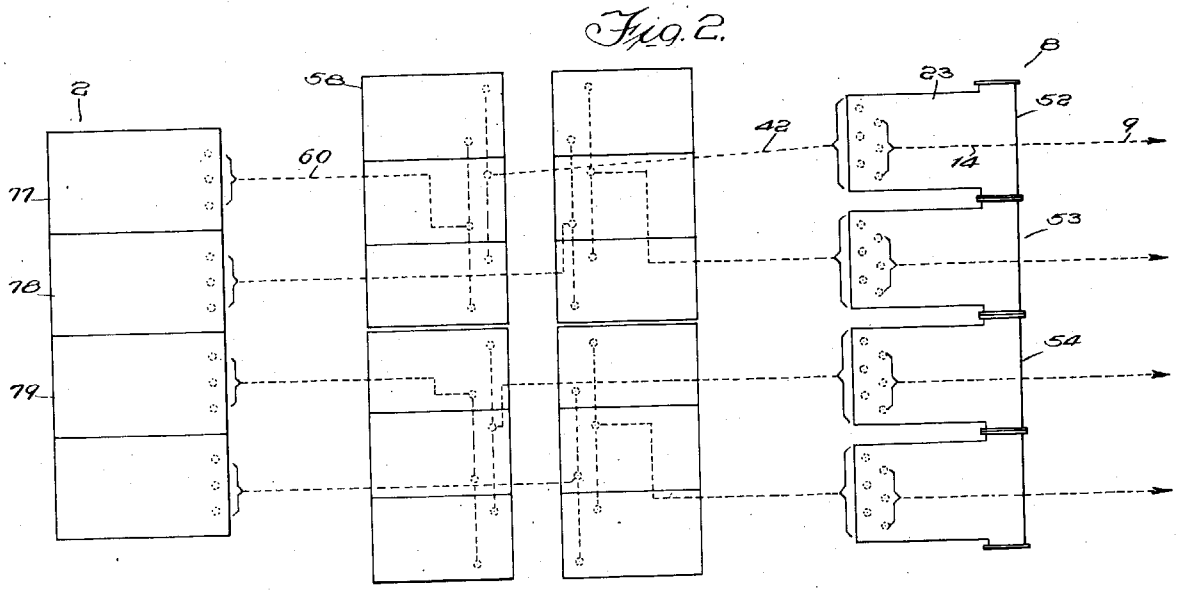
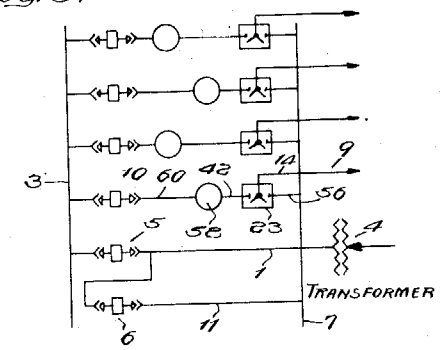
Inventor:
Allen M. Rossman
Witness:
William P. Kilroy
By Brown, Jackson, Boettcher & Dienner
Attys.

Dec. 24, 1935. A. M. ROSSMAN Re. 19,797

ELECTRICAL SWITCHING STATION

Original Filed Oct. 17, 1928 6 Sheets-Sheet 3

Inventor:
Allen M. Rossman

Witness:
William P. Kilroy

Brown Jackson & Ritcher & Lennu
Atty's

Dec. 24, 1935. A. M. ROSSMAN Re. 19,797

ELECTRICAL SWITCHING STATION

Original Filed Oct. 17, 1928 6 Sheets-Sheet 4

Witness:

William P. Kilroy

Inventor:

Allen M. Rossman

By Brown Jackson & Ritter & Dennis

Attys

ELECTRICAL SWITCHING STATION

Original Filed Oct. 17, 1928 6 Sheets-Sheet 5

Inventor:
Allen M. Rossman

Witness:
William P. Kilroy

Brown Jackson Boettcher & Dienner
Attys

Dec. 24, 1935. A. M. ROSSMAN Re. 19,797

ELECTRICAL SWITCHING STATION

Original Filed Oct. 17, 1928 6 Sheets-Sheet 6

Witness:

William P. Kilroy

Inventor:

Allen M. Rossman

By Brown Jackson Boettcher & Dienner

Attys.

Reissued Dec. 24, 1935 Re. 19,797

UNITED STATES PATENT OFFICE 19,797

ELECTRICAL SWITCHING STATION

Allen M. Rossman, Wilmette, Ill., assignor, by mesne assignments, to Rossman, Sargent & Lundy Patents Corporation, Chicago, Ill., a corporation of Illinois Original No. 1,830,409, dated November 3, 1931, Serial No. 312,953, October 17, 1928. Application for reissue October 2, 1933, Serial No. 691,856

32 Claims. (Cl. 175—298)

My invention relates to electrical power distribution and more particularly to substation construction suitable for indoor or outdoor service in supplying power at relatively low transmission voltages, although there is no inherent limitation in the invention as to any particular service or voltage. The particular bus or switching unit, which I shall herein disclose and describe in detail, is adapted for 2300 volt service, but is not to be limited to that potential. Stations of this class are often termed distribution centers.

A bus for switch stations of this character has the duty of subdividing the electrical energy supplied thereto for distribution to users.

Switching equipment is required to connect and disconnect the incoming line and the outgoing feeders to protect them and their connected apparatus from injury due to faulting and the like.

Voltage regulation is generally required to compensate for the load drop and for such other causes as may tend to result in variation of voltage on the terminals of the consumers' circuits. Preferably, each feeder has its own regulator.

The station may or may not include a transformer in the line. The bus is merely a manifolding connection through which the feeders connect to the common incoming power line. The feeders and the line are provided with oil circuit breakers capable of breaking the circuits under load.

For the purpose of taking the oil circuit breakers out of service, a transfer bus is provided. This is a manifolding connection like the main bus, constituting an alternative connection which may be employed temporarily while the main bus and regulators and the main group of oil circuit breakers are taken out of circuit. An oil circuit breaker is preferably included in the connection of the line to the transfer bus so that the line may be opened under load, if necessary.

Stations of this character, as heretofore constructed, have been unduly complicated in construction and assembly and occupied excessive space and have been surprisingly unsightly in appearance.

According to the present invention, I provide a construction cheaper and better than heretofore known for this service, simpler in construction and assembly, more compact and smaller in size, completely enclosed, and sightly in appearance.

The manner of accomplishing this will be more apparent from the following specification and drawings, in which I have shown an embodiment of the invention which involves the use of sectional enclosures for the feeders and their connections, complete housing of all of the parts and insulation of the bus and connecting conductors in high grade self-healing insulation, such as insulating oil. The station is made up of any desired number of standard units, these units including, in each case, parts which need only to be set up and bolted together with suitable joining of the electrical parts as by splicing, with consequently low cost of field work, which heretofore has been unavoidably high.

Furthermore, in conjunction with my invention, I have provided an improved form of transfer switch for switching the circuit between the main and the transfer bus, which has previously been accomplished by disconnect switches of the open air type. According to the preferred form of my invention, I employ a form of selector switch embodying oil insulation making a compact unit suitable for enclosure.

Preferably, the transfer switches with their connections are assembled in units corresponding to the main bus and switch units so that a station may be built up of units of substantially equal length, so that a balanced arrangement of parts prevails even in case it is necessary to increase the station to accommodate a relatively large number of lines.

The invention is applicable not only to three phase circuits, but to single phase circuits, as well.

Now, in order to acquaint those skilled in the art with the manner of constructing and operating my invention, I shall describe in connection with the accompanying drawings, a specific embodiment of my invention.

Figure 2 is a diagrammatic plan view of the same;

Figure 3 is a diagram of connections;

Figure 1:
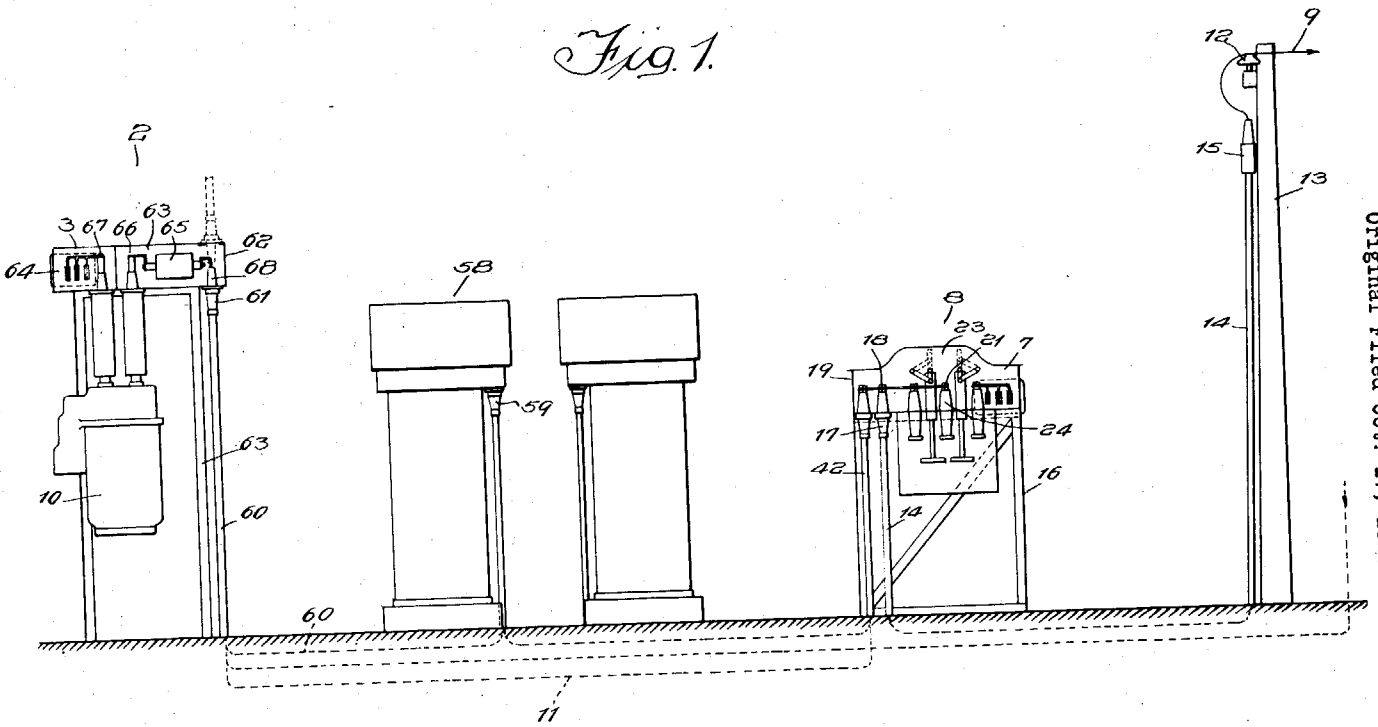
Figure 1 is a side elevational view, partly in section, of an installation embodying my invention.

Referring now to Figure 1, in which I have shown in side elevation, partly in section, a station embodying my invention, the incoming power line is indicated at 1. This line may be connected to a transformer located at the station herein shown, or it may be connected through suitable overhead or underground conductors to a source of power which is to be subdivided in the station. The conductor 1, in the present case, enters as a three phase cable or as three single phase cables extending underground, as indicated in the dotted lines in Figure 1 and then up through a short vertical run to the main bus and switching unit 2 where, as will be apparent by reference to Figure 3, it is adapted to make connection with the main bus 3. In the diagram in Figure 3, the transformer 4 for supplying power to the station is indicated. The incoming line is adapted to be connected to the main bus 3 through an oil circuit breaker 5, such an oil circuit breaker being indicated at 10 in Figure 1. By means of circuit breaker 6 and conductor 11, the incoming power line 1 is adapted to be connected to the transfer bus 7 in the transfer bus and switch unit 8. The circuit breakers, such as 5 and 6, have disconnectible contacts; that is, by lowering the circuit breakers, they may be disconnected from the corresponding terminals, as is well-known in the art. This is a feature which is well understood and I have not illustrated the same in detail, nor claimed the same as my invention. In Figure 1, one of the lines 9 is indicated as leaving the station by aerial conductors mounted upon the insulators 12 on the poles such as 13. The conductors of the line 9 enter cable 14 as through the pot head 15.

Obviously, the three phase line may be extended as three single phase cables 14. The cables 14 extend underground and then upwardly within the casing 16 of the transfer bus and switch unit 8 through suitable pot heads 17 to terminals 18 (see Figure 7). From the terminals 18, within the bus housing 19, conductors 20 extend to the central terminal posts 21 of the transfer switch mechanism 23. The contacts 21 are mounted upon suitable insulator bushings 24. Conductors extend through these bushings to the switch contacts 25 (see Fig. 12) mounted upon extensions of the bushings within the oil pot 26, which contains a bath of oil for the operating parts of the transfer switch 23. The bottom wall 27 of the casing 19 forms a suitable cover for the oil pot 26 and said oil pot 26 is suitably suspended from the bottom wall 27. Adjacent the contact posts 21 and in line therewith, upon opposite sides, are contact posts 28 and 29. These posts are likewise mounted upon suitable bushings 30 and 31. These bushings are mounted in the bottom wall 27 like bushing 24 and extend downwardly into the oil pot 26 where they support the switch contacts 34 and 35. Suitable switch contacts, such as 36 and 37, are provided for making connection between the central contacts 25 and either of the contacts 34 leading to the main bus, as will be explained later, or to the transfer bus 7 through contact 35. The posts 28 are, in turn, connected by conductors 38 to connecting posts 39 extending into bushings 40 and pot heads 41 into connection with the cables 42.

The contacts 36 and 37 are mounted upon suitable operating rods 43, 44, extending through tubular portions 45 mounted in the lower wall 27 of the housing 19. Suitable operating mechanism for the rods 43 and 44 is indicated at the levers 46 and 47 on Figure 7. The particular mechanism for raising and lowering the rods 43 and 44, and thereby the contacts 36 and 37, is well known in the art and need not be disclosed herein in detail. Suffice it to say that by the handles 46 and 47, suitable rock shafts acting through arms and links, raise and lower the operating rods and thereby the contacts. The contacts are operated in groups of three for the three phase conductors, as will be apparent from the drawings, the installation shown in Figure 1 being a three phase system, although the diagram of Figure 3 is a single line diagram.

Figure 7:
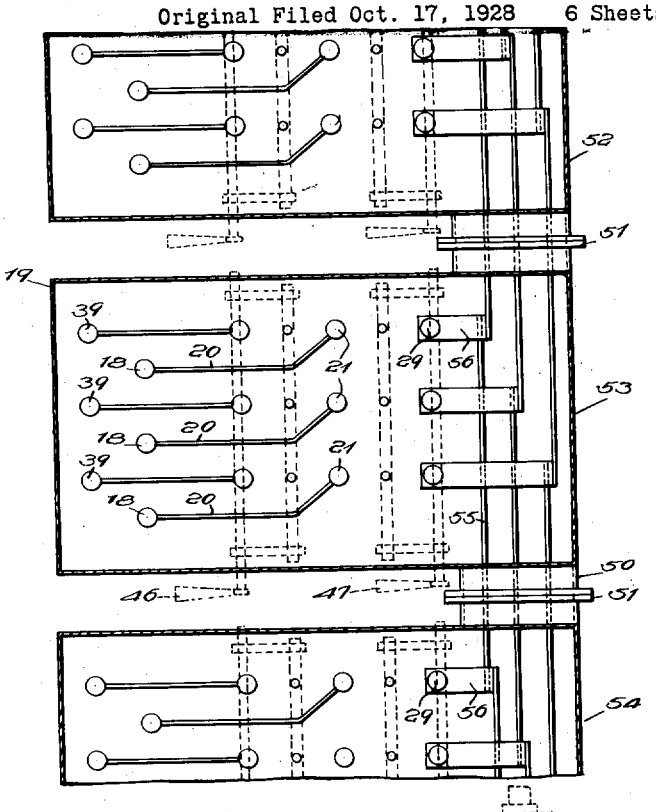
Figure 7 is a plan view, partly in section, of the transfer bus switch, shown at the right of Figure 1.
Figure 12:
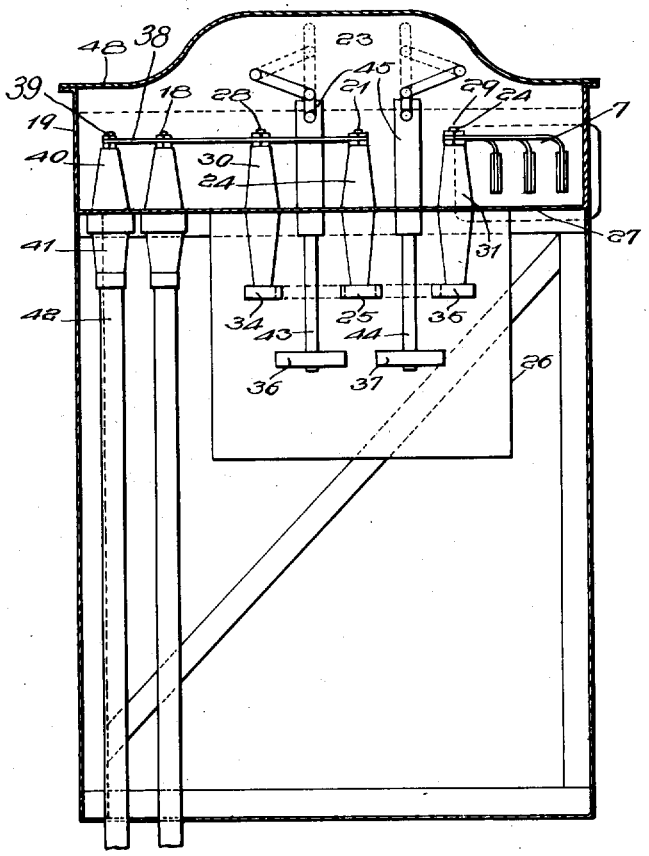
Figure 12 is a vertical section through the transfer switch and bus structure.

The individual housing 19, shown in plan in Figure 7 and in section in Figure 12 is duplicated for each line circuit. The housing 19 has a cover at 48 removably mounted thereupon for assembly and inspection while in service. The casing 19 has an extension or neck 50 at each side (see Figure 7), provided with suitable coupling flanges 51 for bolting to the flanges of adjacent sections. In Figure 7, three units are indicated, namely, units 52, 53, and 54, all being alike and intercommunicating through the necks or tubular connections 50, joined by the bolting flanges 51.

The bus 7 is built up of sections of copper bar extending between the adjacent sections, such for example, as the bar 55 extending from the unit 54 to the unit 53. This bar 55 is connected to the unit 53 by a strap 56 mounted on the post 29 and likewise the unit 54 is connected to a strap 56 mounted on a corresponding post 29. In like manner, the other conductors of the bus are formed of sections connected by straps on which they are supported from the corresponding posts 29. The straps, such as 56, are of graduated length, so as to space the bus conductors a suitable distance from each other and from the surrounding metal casing. The metal casing which is built up of the units 52, 53, 54, etc., is preferably filled with insulating oil to a level well above the live parts, as indicated by the dotted line shown in Figure 12. The bus is thereby completely submerged in oil. In installing a bus and switch unit 8, the individual units with their corresponding individual base sections are set in place on a suitable foundation and are bolted together. The base for the units of the transfer bus and switch structure are made of suitable steel sections and may be covered with sheet metal removable sides if desired. The same form of structure may be employed in making up the bases for the main bus and switch structure. The covers, such as 48, are removed and the bus 7 is built up by inserting the bus sections, such as 55, through the bolted necks or tubular extensions 50 and then clamped in place to the supporting straps, such as 56, and to the ends of adjacent sections. The sections 55 are all of the same length and, hence, are interchangeable in assembly.

All that is required in installing the units, therefore, is to bolt them together at the flanges 51, insert the bus conductor sections through the open tops, and extend them through the necks 50 and bolt them in place through the straps 56 and to each other. The transfer switch 23 is indicated diagrammatically in Figure 3 as being able to make connection alternatively with the conductor 56, leading to the bus 7 or to the cable 42, which extends to the induction regulator 58, which is set on a foundation between the transfer bus and switch units 8 and the main bus and switch units 2. The cable 42 extends down inside the supporting base 16 and underground through a suitable conduit upward along the side of the induction regulator 58 to a pot head, as indicated at 59. From a similar pot head 59, a cable 60 extends to pot head 61, extending into casing 62. The casing 62 is mounted on the upper end of the supporting base 63. The casing 62 comprises two compartments 63 and 64, in the former of which are mounted the current transformers 65 and suitable terminal posts 66 leading to the oil circuit breakers such as 10, shown in Figure 1. In the compartment 64 is mounted the main bus 3 and a connecting post 67 leading to the opposite terminal of the oil circuit breakers 10. Preferably, but not necessarily, both compartments 63 and 64 are filled with insulating oil to a level as indicated in dotted lines in Figure 5. The pot head 61, in the present instance, is a single conductor cable pot head extending upwardly in the form of a bushing 68 and the conductor therefrom being joined to the terminal of the current transformer 65. The opposite terminal of the current transformer 65 is connected by a strap to the post 66.

Figure 6:
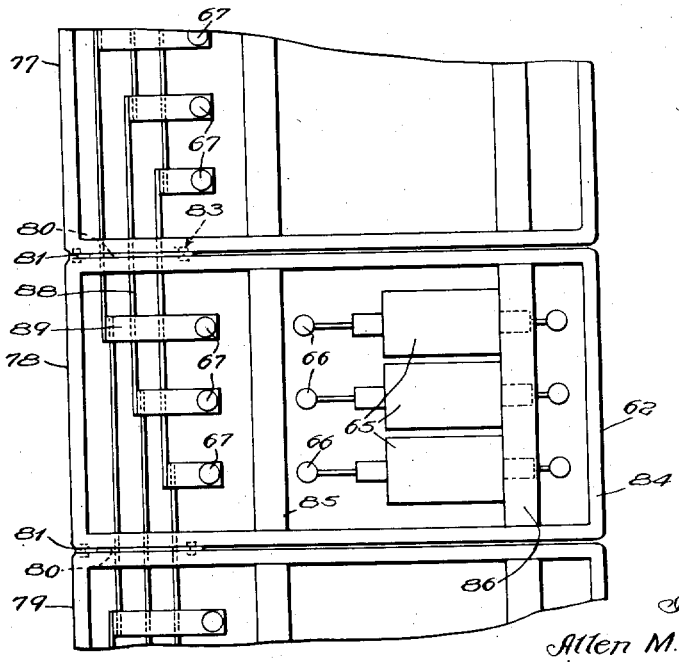
Figure 6 is a modified form of unit casing construction, corresponding to Figure 4.
Figure 5:
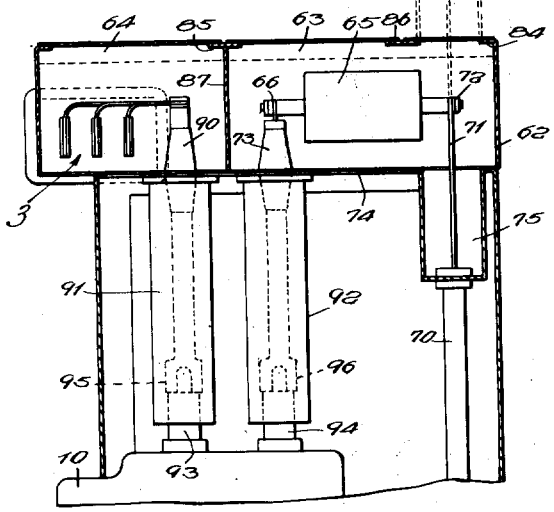
Figure 5 is a vertical sectional view of the same.
Figure 13:
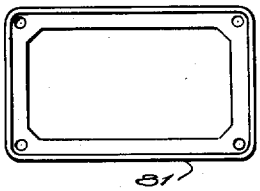
Figure 13 is a plan view of a detail.

As an alternative arrangement, a three phase cable, as indicated at 70 in Figure 5, may be employed and the conductors from this cable fanned out, as indicated at 71, to the terminals 72 of the current transformers 65, the opposite ends of which are connected to corresponding terminal 66 mounted on and in suitable bushings 73, supported on the lower wall 74 of the casing 62. In this case, that is, where a three conductor cable is employed, a suitable common pot head 75 is provided and this may be filled with compound, oil, or may be otherwise treated to fan out the conductors and hold them in a permanently insulated relation and, at the same time, to close off the opening in the lower wall 74 of the casing 62 where the conductors 71 enter the same. Obviously, as indicated in dotted lines in Figures 1 and 5, the incoming cable connection may be made above instead of below the casing 62. Referring to Figure 6, the construction of the individual casing sections will be understood. In Figure 6, there are shown three units 77, 78 and 79. They are all alike, unit 78 being shown in detail. The casings 62 are built up of sheet metal with removable covers, adapted to be bolted down and having connecting openings as indicated at 80—80, between the individual casings of the units 77, 78 and 79, suitable gaskets and plates 81, as shown in Figure 13, being interposed and the casings of the units being bolted together by bolts, such as 83, from the inside. The cover is preferably made in sections and the casing, such as 62, has a peripheral inturned flange 84 extending around the margin with suitable bridging pieces, such as 85 and 86, extending crosswise of the top of the casing to permit the sections of the cover to be separately attached.

The construction of the casings containing the live parts such as bus conductors, current transformers and the like of fabricated sheet metal as above stated has been found to have a peculiar advantage not heretofore attained.

Metal enclosed busses are old, but as far as I am aware cast metal has always been employed. There are a number of reasons for this, chief of which are the simplicity of making relatively complex forms and the ability to cast the enclosure in sections which can be machined and clamped together to make a relatively tight enclosure. The cast metal enclosure has heretofore also served as the frame for supporting the circuit breakers or their terminals. Also such prior cast bus enclosures have heretofore generally been filled with a compound and not a fluid insulation.

Such cast enclosures have the undesirable quality of cracking and shattering in case of a fault within the same, which results in an explosion. To use them with insulating oil which is inflammable and which flaming oil would, if the enclosure were shattered, be splashed over everything nearby is particularly undesirable as is known to those skilled in the art.

My enclosures being built up of sheet metal will not shatter if subjected to an explosion. For equal strength my enclosures are relatively much lighter and even if they should be ruptured, they will not produce the bomb effect with the consequent spraying of burning oil over the adjacent apparatus or attendants.

I believe that this combination is broadly new in installations of the class to which my invention relates.

The bus enclosure is supported on a frame built up of structural steel parts.

By the above type of construction further advantages are secured. With this type of construction the construction and storage of patterns for making large and numerous castings is not required. The fabrication of sheet metal units requires no heavy manufacturing or handling machinery as is required for large castings. The field labor of assembling is much less.

A further advantage resides in the compactness which may be secured. The walls of the compartments may be made much thinner and hence occupy less space. Also less metal is subjected to magnetic losses.

Also in shipment the units are easier to handle, are lighter, and less subject to breakage.

This construction is shown more in detail in Figure 5. The compartments 63 and 64 are separated by a wall 87, which bears at its upper edge the cross strip 85. The main bus 3 is built up of bus section such, for example, as the section 88 (see Fig. 6) and strap members 89 bolted together and the strap members 89 being supported from the inside of posts 67. The straps 89 are graduated in length, so as to space the bus conductors properly with respect to each other. Preferably, both compartments of the casing 62, in each case, are filled with insulating oil or other suitable insulating liquid. The posts 67 are mounted upon suitable insulating bushings 90 and these, in turn, are mounted upon the bottom wall 74 of the casing 62. Conductors extend through the bushings 90 and 73, as will be apparent from Figure 5, into the depending tubes 91 and 92, which are open at their lower ends and provided with suitable disconnectable contacts, so that the circuit breakers, such as 10, may be disconnected by dropping the same downwardly in the supporting casing 63. These tubes 91 and 92 are preferably formed of metal, with suitable insulation disposed therein and the sockets for the disconnectable contacts being mounted within the tubes, so that the bushings 93 and 94 of the oil circuit breaker 10 which carry suitable contacts at their upper ends may close the circuit at the sockets 95 and 96 indicated in dotted lines in Figure 5. As an alternative method of joining the units 77, 78 and 79, suitable necks, such as 97, having bolting flanges 98, may be provided on each side of the casing section, as indicated in Figure 4.

Figure 4:
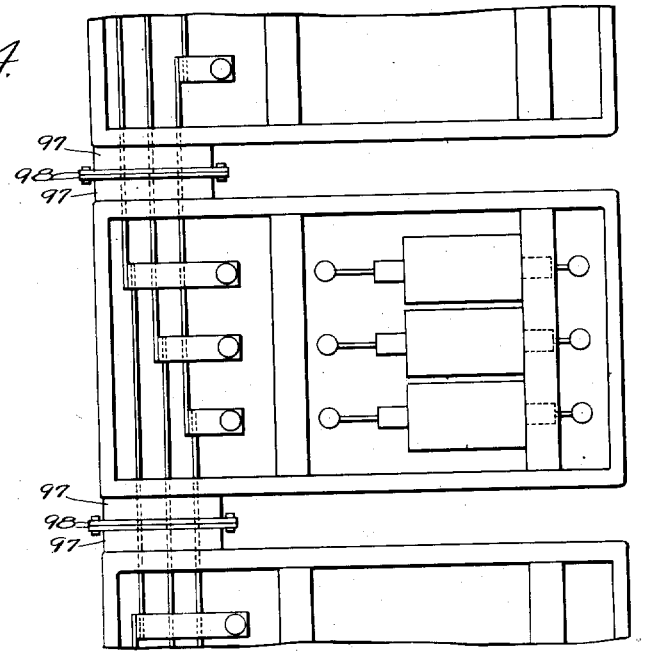
Figure 4 is a plan view, partly in section, showing the main bus and circuit breaker connections.

The casing sections are slightly narrower in Figure 4 or the spacing of the casing sections may be increased if desired. It is preferable, as indicated in the diagram of Figure 2, which shows the general layout, to have the units, such as 77, 78 and 79 of the main bus and switch structure 2, of substantially the same width as the corresponding sections 52, 53 and 54 of the transfer bus and switch unit 8. Induction regulators, such as 58, occupy considerably more space in width than do the individual units of either the main bus and switching structure or the transfer bus and switching structure. However, by arranging two rows of induction regulators, as shown in the diagram of Figure 2, I am able to provide a relatively compact structure. In case of a larger number of lines, the induction regulators may be arranged edgewise instead of transversely or arranged in more than two rows.

The resultant structure is compact and sightly, and requires no housing, everything being enclosed and all of the live parts may be completely insulated either by a bath of oil or by suitable cable insulation.

Figure 8:
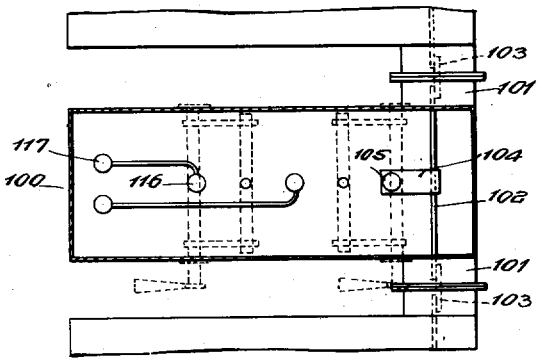
Figure 8 is a plan view, partly in section.
Figure 9:
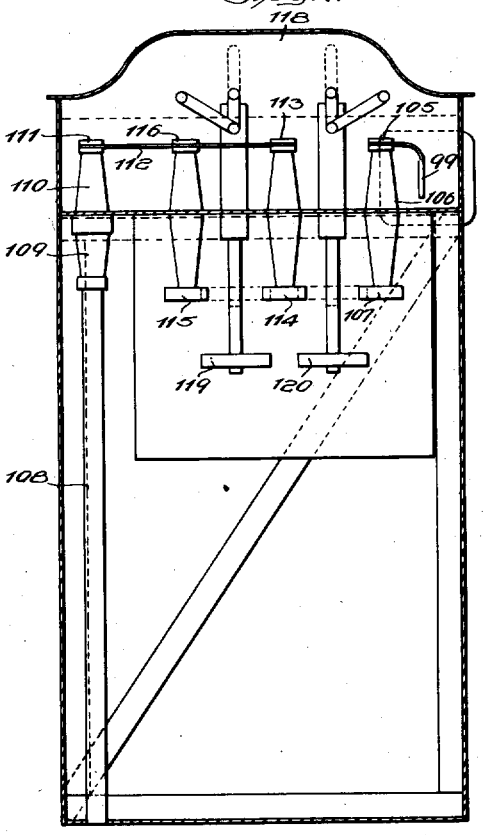
Figure 9 is a vertical section of a single phase switching equipment.

While the above embodiment has been described specifically with respect to three phase distribution, it is to be understood that the invention is applicable equally to single phase distribution. For example, in Figures 8 and 9, I have illustrated a single phase bus and switch construction which shows the manner in which the invention may be embodied in a single phase installation.

In this case, a single bus 99 is employed for the transfer bus, the conductor thereof is made up of sections, such as 102, extending into the flanged necks 101 where short joining bars, such as 103, may be bolted to the ends of the section 102 for joining one unit to the adjacent units. The bus section 102 is connected by a suitable strap 104 to the post 105 mounted on bushing 106 carrying at its lower end the switch contact 107. The incoming line enters through cable 108, pot head 109, into the lower wall of the section of the casing 100, through the bushing 110 and is connected to post 111, this post, in turn, being connected by a short section of bus bar 112 to the post 113, which is mounted upon a suitable bushing extending through the lower wall of the casing and providing connection with the central switch contact 114. A switch contact 115 mounted on a suitable bushing, extending through the bottom wall of the casing, is connected to the post 116 and it, in turn, is connected to post 117, leading through a cable connection to the main bus unit, which will be constructed in substantially the same manner as described in connection with the foregoing modification, except that a single phase bus and single circuit breaker are employed. The transfer switch 118 comprises the movable contact members 119 and 120, adapted to be operated for closing the circuit either to the transfer bus 99 through the contacts 114 and 107 or to the main bus through contacts 114 and 115. Suitable operating mechanism is provided for raising and lowering the contacts 119 and 120, as will be well understood by those skilled in the art.

Figure 10:
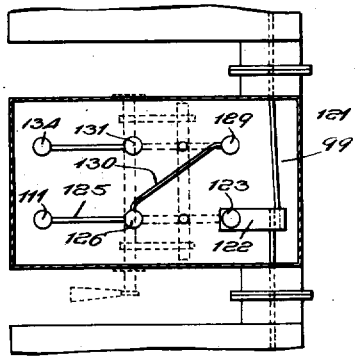
Figure 10 is a plan view, partly in section.
Figure 11:
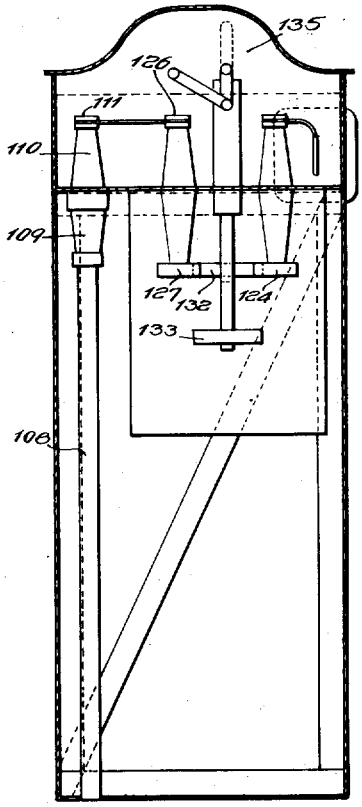
Figure 11 is a vertical section of a modified form of a single phase switching equipment.

In Figures 10 and 11, I have shown a modified form of the single phase arrangement in which the transfer bus 99 is built up of sections, such as 121, extending from one section to the adjacent section, as disclosed in connection with the preferred form in Figure 1, a strip or section of bus bar 122 connecting the bus sections to a post 123 mounted on a suitable bushing carrying at its lower end within the oil pot of the transfer switch, a switch contact 124. The incoming line enters through cable 108, pot head 109, bushing 110, to post 111. This post is connected by a conductor 125 to the post 126, which extends through a suitable bushing down through the bottom wall of the casing to a switch contact 127. The post 126 is connected to another post 129 by a conductor 130. The post 129 extends down through a suitable bushing and carries a switch contact directly back of the switch contact 124, shown in Figure 11. Similarly, a post 131, lying in line with the post 129, bears a switch contact which is directly back of the contact 127 shown in Figure 11. It is, in turn, adapted to be connected to the contact of the post 129 by a switch member 132, shown in Figure 11, the contacts 127 and 124 being adapted to be connected by the switch member 133. The post 131 is, in turn, connected to post 134, leading to the main bus and switch structure.

The transfer switch 135, having the movable contact members 132 and 133, is adapted to bring them alternatively into engagement with their contacts so that posts 126 and 123 are connected in one position of the switch mechanism 135 and the posts 131 and 129 are, at that time, disconnected.

In another position of the switch 135, the posts 131 and 129 are connected and the posts 123 and 126 disconnected. The two schemes shown in Figures 8, 9, and 10, 11, while comprising different embodiments, are capable of securing the same general functions and results.

By the above described scheme of construction, the units are all interchangeable, regardless of the number of lines that are to be served and the design and construction of any size station, within limits, is rendered exceedingly simple. If the station is to be extended to include another line, another unit is added to the main bus and switch structure 2, likewise another unit is added to the transfer bus and switch structure 8 and an additional induction regulator mounted between them or at any suitable point. While I have shown the induction regulators as mounted between the main and transfer units, it is to be understood that this may be varied without in any wise departing from the invention, since the advantage of unitary construction, complete enclosure, oil insulation of the buses, and sightliness may all be secured, even though the parts are differently arranged from what I have shown as the preferred mode of arrangement. The base of the main structure 2 permits the oil switches, such as 10, to be dropped for disconnecting them and the bases 16 for the transfer units 8 permit the oil pots of the transfer switch to be lowered, so as to disclose the transfer switch contacts, if desired. The transfer switch, while it is made in the form of an oil switch, is not intended to be employed for breaking the circuit under load.

It is merely an oil enclosed disconnecting switch conveniently operable and insulated in oil, so as to be a compact and efficient construction. It is to be understood that, if desired, another form of transfer switch mechanism may be employed without departing from the broad scope of my invention. The entire system is weatherproof. Optionally, on indoor service, the oil bath for the buses may be omitted, although I consider it a highly desirable feature.

Auxiliary apparatus may be installed in suitable housings as adjuncts to the station and a section of the transfer structure which corresponds to the arrangement of the circuit breakers 5 and 6 (see Figure 3) may be devoted to auxiliary apparatus such as meters and the like, although this is optional. I do not intend to be limited to the details shown and described, except as they are recited as essential in the appended claims.

I claim:

1. In a station of the class described, a plurality of main bus and switching units, a plurality of transfer bus and switching units, said units being structurally separate, each main bus unit comprising a casing section, a load circuit breaker and bus conductor sections, the transfer units each comprising enclosed oil insulator transfer switches not suited for load interruption, and metal sheathed cables extending between the main units and the transfer units and in series with the circuit breakers and the transfer switches.

2. In a station of the class described, a main bus and switching structure, comprising an enclosed bus and a plurality of circuit breakers connected thereto, a transfer bus and switch structure comprising an enclosed bus and a plurality of liquid insulated two way transfer switches connected thereto, said structures being structurally independent and extending parallel to each other, and outgoing feeders connected to the two way transfer switches, said two way transfer switches having selective connection to the transfer bus directly and to the main bus through the oil circuit breakers and metal clad cables forming the electrical connections between said structures.

3. In a station of the class described, a plurality of main bus and switching units, each unit comprising a casing section containing a section of the main bus and having an enclosed oil circuit breaker of the load interrupting type, the casing sections being connected together and the bus sections being connected together to form a main bus, a plurality of transfer bus and switching units, each unit comprising a casing section containing a section of the transfer bus and having an enclosed oil filled two way transfer switch of an interrupting capacity not suitable for breaking the circuit under load, the latter casing sections being connected together and the latter bus sections being connected together to form a transfer bus, a power supply line, enclosed oil circuit breakers of load interrupting type for connecting said supply line to the main bus and to the transfer bus, feeders connected to the transfer switches and connectible by the transfer switches directly to the bus and through the oil circuit breakers to the main bus and sheathed cables forming the electrical connections between said circuit breakers and said transfer switches.

4. In a system of the class described, a main bus, a transfer bus, individual casings for the buses, a power supply conductor, oil circuit breakers, of load interrupting type for connecting said power supply conductor to said main bus and to said transfer bus, said oil circuit breakers being mounted below the main bus casing and having socket type connections for disconnection of the oil circuit breakers from the main bus feeders, enclosed liquid insulated two way switches for connecting the feeders to either the main bus or to the transfer bus, said two-way switches being mounted below the transfer bus casing and oil circuit breakers of the load interrupting type in the connections between the two way switches and the main bus and likewise being mounted below the main bus casing, and metal sheathed casings forming the connection between said oil circuit breakers and said two-way switches.

5. In a system of the class described, a main bus and switch structure comprising an enclosed main bus and enclosed oil circuit breakers connected thereto, a transfer bus and switch structure, comprising an enclosed transfer bus and enclosed liquid insulated two way transfer switches, said structures being spaced apart and having individual supporting bases, said latter structure comprising connected casing sections each enclosing bus sections and a plurality of of liquid insulated terminals comprising one terminal connected to the corresponding bus section, another terminal connected to the main bus through one of said oil circuit breakers, and an intermediate terminal, movable switch means for switching said terminals and a feeder conductor connected to said intermediate terminal and sheathed cables forming the connections between said oil circuit breakers and said transfer switches.

6. In combination, a plurality of outgoing feeder lines, a main bus and switch structure comprising a plurality of bus and switch units corresponding to the lines, each unit comprising a closed housing, adjacent housings being in communication, main bus sections for each unit disposed in said communicating housings and circuit breakers connected on one side to the corresponding main bus sections, a corresponding plurality of transfer bus and switch units each comprising a closed housing having therein a corresponding bus section and having a communicating two way liquid insulated selector switch comprising three terminals, one terminal being connected to the corresponding transfer bus section, another being connected to the corresponding main bus section through its associated circuit breaker, the third connected to the corresponding line conductor, and means for connecting the third terminal to either of the other two, the main bus and switch structures comprising one structural unit and the transfer bus and switch structure comprising a separate structural unit, said units being spaced apart and metal clad cables connecting them.

7. A transfer bus and switch structure, comprising a bus housing formed of a plurality of housing units connected together side by side and having a continuous passage, two insulated switch posts supported in each housing section and having conductors extending through the casing into connection with said posts, bus conductors comprising sections corresponding to the housing units joined together and extending longitudinally of said passageway, a switch post in each housing section connected to the corresponding bus section, and selector means for selectively connecting said posts in each housing section and pairs of underground cables terminating in posts in each of said housing units.

8. A bus and switch structure, comprising a bus housing formed of a plurality of housing units having registering openings, said units being connected together side by side, so that the openings form a continuous passage, a bus comprising sectional bus conductors corresponding to the housing units, insulated posts on the housing units having transverse conductors extending into contact with the bus conductors and supporting the same, liquid insulated switching means individual to the housing units disposed below the housing units and comprising extensions of said posts, said switching means each constituting a two way selector switch.

9. In a section of the character described, a transfer bus having associated transfer switches, a housing enclosing said transfer bus, a bath of oil in the housing for insulating the transfer bus and its associated conductors, groups of insulated terminal posts mounted in and extending through the bottom wall of the housing and having switching contacts at their lower ends, oil pots for said groups of switching contacts, and movable selector switch means disposed in said oil pots for selectively connecting said switching contacts.

10. In a station of the class described, a transfer bus and switch structure comprising a transfer bus, a plurality of housing sections each section having a bus enclosing portion, said sections being connected together to form an enclosure for the bus, insulated posts mounted in the bottom wall of each housing section, having their upper ends forming terminals within the housing section and the lower ends bearing switch contacts outside the housing section, a pair of insulated conductors entering each housing section and connected to corresponding terminals, a conductor within the housing section joining another terminal to the bus, an oil pot for said switch contacts of each housing section, and selectively operable switch means within the oil pot for connecting said switch contacts.

11. In a station of the class described, a transfer bus and switch structure comprising a transfer bus, a plurality of connected housing sections, each section comprising a longitudinally extending portion for housing a section of the transfer bus and a laterally extending portion, a main bus connection and a feeder line connection, extending into each laterally extending portion, said connections comprising metal clad cables, insulated posts extending through the bottom wall of the housing section between said connections and the bus, said posts at their upper ends being connected to said main bus connection, said feeder line connection and said transfer bus respectively and bearing switch contacts at their lower ends, means for maintaining a bath of oil about said switch contacts, and movable selector switch means cooperating with said contacts for selectively connecting the feeder line to the main bus or to the auxiliary bus.

12. In a bus and switch structure, a plurality of similar housing units having registering openings, said units being connected together to provide a continuous passageway through said openings, sectional bus conductors extending through said passageway, switch posts having transverse connectors extending into contact with the bus conductors, switch posts adjacent the first-named switch posts, lines connected to said second named switch posts, a third group of switch posts mounted adjacent the second group of switch posts, end conductors connected to said third group of switch posts, all of said switch posts being mounted on the bottom wall of the casing sections and having switch contacts disposed below the bottom wall thereof, oil pots enclosing the switch contacts of each housing unit and movable switching members disposed in said oil pots for connecting the contacts of the second group of posts with the contacts of the other groups of posts selectively to put the line conductors selectively in circuit with the transfer bus or with the last named conductors.

13. In a station of the distribution center type, the combination of an incoming power supply line and one or more outgoing power distribution lines, a main bus and circuit breaker device comprising a main bus and oil circuit breakers structurally joined into a common unit, a transfer bus and selector switch device comprising a transfer bus and an oil insulated transfer switch, structurally joined into a separate common unit, said main bus and circuit breaker device comprising a power supply line load circuit breaker connected between the incoming power supply line and the main bus, and comprising also a power supply line load circuit breaker between the incoming power supply line and the transfer bus, and comprising also an outgoing line load circuit breaker for each line circuit, connected between the main bus and the corresponding selector switch in the second device, said selector switches having movable members for connecting the outgoing power distribution lines to either the transfer bus or to the main bus, the latter connection being made through the outgoing line load circuit breakers aforesaid.

14. In a station of the class described, the combination of an incoming power supply line, one or more outgoing power distribution lines, a main bus and circuit breaker device comprising a main bus and oil circuit breakers structurally joined into a common unit, a transfer bus and selector switch device comprising a transfer bus and one or more oil insulated selector type transfer switches, all structurally joined into a separate common unit, said selector switches having selectable contacts and movable selecting contacts, said main bus and circuit breaker device comprising a power supply line load circuit breaker connected between the incoming power supply line and the main bus, and comprising also a power supply line load circuit breaker between the power supply line and the transfer bus, and comprising also an outgoing line load circuit breaker for each outgoing line connected on one side to the main bus, a connection for each line extending from the other side of said last named circuit breakers to the selectable contact of the corresponding selector switches, regulators included serially in said last named connections, the outgoing lines being connected to the selecting contacts, of the said selector switches, to permit feeding of said lines from either the main bus or from the transfer bus.

15. In a station of the class described, the combination of an incoming power supply line, one or more outgoing power distribution lines, a main bus and circuit breaker device comprising a main bus and oil circuit breakers structurally joined into a common, enclosed and metal-clad unit, said oil circuit breakers being provided with slip terminals for disconnection by removal of the same, a transfer bus and selector switch device comprising a transfer bus and one or more oil insulated selector type transfer switches, all structuraly joined into a common, metal-sheathed and enclosed unit, said selector switches having selectable contacts and movable selecting contacts, said selecting contacts comprising pairs of movable members adapted to close the connection to both buses before disconnecting either bus, so that the load may be shifted from one bus to the other without interruption, said main bus and circuit breaker devices comprising a power supply line load circuit breaker connected between the incoming power supply line and the main bus, and comprising, also, a power supply line load circuit breaker between the power supply line and the transfer bus, and comprising also an outgoing line load circuit breaker for each outgoing line, connected on one side to the main bus, a connection for each line extending from the other side of said last named circuit breakers to the selectable contacts of the corresponding selector switches, regulators included serially in said last named connection, the outgoing lines being connected to the selecting contacts of the said selector switches to permit feeding of said lines from either the main bus or from the transfer bus, either bus being capable of complete disconnection from the power line when the load is carried by the other bus, the connections between said devices and said regulators comprising lead sheathed cables terminating in pot heads at each end thereof.

16. A bus and switch structure for a station of the class described, comprising a plurality of sections joined together to provide a continuous passageway through the sections, said sections having lateral extensions divided off from the continuous passageway by barrier walls to provide chambers, a sectional bus extending through said continuous passageway, circuit breaker terminal posts mounted in the sections adjacent the bus and corresponding circuit breaker terminal posts mounted in the associated chambers, circuit breakers connected to said terminal posts and disposed below the sections and means for bringing power conductors into the said chambers for connection to the associated circuit breaker terminal posts in said chambers.

17. A bus and switch structure for a station of the class described, comprising a plurality of sections joined together to provide a continuous passageway through the sections, said sections having lateral extensions divided off from the continuous passageway by barrier walls to provide chambers, a sectional bus extending through said continuous passageway, circuit breaker terminal posts mounted in the sections adjacent the bus and corresponding circuit breaker terminal posts mounted in the associated chambers, circuit breakers connected to said terminal posts and means for bringing power conductors into said chambers for connection to the associated circuit breaker terminal posts in said chambers, and current transformers for said conductors disposed in said chambers, said continuous passageway and said chambers being oil filled to insulate the electrical parts disposed therein.

18. A bus and switch structure comprising a plurality of longitudinally extending casing sections joined together endwise to provide a passageway through the sections, said sections having lateral extensions divided off from the continuous passageway by barrier walls to provide associated chambers, a sectional bus extending through said continuous passageway, the sections of the bus being joined together to form electrically continuous conductors, circuit breaker terminal posts mounted in the casing sections adjacent the bus and connected to the bus conductors; corresponding circuit breaker terminal posts mounted in the associated chambers, circuit breakers having terminals for connection with said terminal posts and disposed below the sections, disconnecting couplings between the said terminal posts and the circuit breaker terminals, current transformers disposed in the associated chambers and connected to the said terminal posts in said chambers, and means for bringing power conductors into the said chambers for connection to said current transformers, said casing sections and associated chambers being fabricated of wrought metal.

19. In combination a hollow fabricated frame, a fabricated wrought metal casing section disposed upon the frame and having a passageway extending longitudinally therethrough, sections of bus conductors disposed longitudinally within the casing section, conducting studs extending from within the casing section to a point within the hollow frame and being connected to the bus conductor sections, a fabricated wrought metal chamber mounted on the frame adjacent the casing section, conducting studs extending from within the chamber to a point within the hollow frame, a circuit breaker mounted within and supported by the hollow frame and having terminals registering with the downwardly extending studs, and means for bringing power conductors into said chamber for connection to the corresponding conducting studs therein.

20. In combination a hollow fabricated frame, a fabricated wrought metal casing section disposed upon the frame and having a passageway extending longitudinally therethrough, sections of bus conductors disposed longitudinally within the casing section, conducting studs extending from within the casing section to a point within the hollow frame and being connected to the bus conductor sections, a fabricated wrought metal chamber mounted on the frame adjacent the casing section, conducting studs extending from within the chamber to a point within the hollow frame, a circuit breaker mounted within and supported by the hollow frame and having terminals registering with the downwardly extending studs, current transformers disposed in the chambers and connected to the corresponding conducting studs, and means for bringing power conductors into the chamber for connection to the current transformers.

21. In metal clad switchgear including a supporting frame and a switch unit having disconnecting contacts vertically movable therein to connected and disconnected positions, a superstructure mounted on said frame comprising a unitary sheet metal housing having a metallic isolating partition for dividing the same into compartments including a bus bar compartment, said compartments having apertures in the bottom wall thereof on opposite sides of said partition and said bus bar compartment provided with removable cover structure at opposite ends thereof, and insulating shields supporting fixed disconnecting contacts mounted in and extending through said apertures, said fixed disconnecting contacts being connected to busbars in said bus bar compartment and to electrical conductors in another of said compartments.

22. In metal clad switchgear including a supporting frame and a switch unit having disconnecting contacts vertically movable therein to connected and disconnected positions, a superstructure mounted on said frame comprising a unitary sheet metal housing having a metallic isolating partition for dividing the same into compartments including a bus bar compartment, said compartments having apertures in the bottom wall thereof on opposite sides of said partition and said bus bar compartment provided with removable cover structure, and insulating shields supporting fixed disconnecting contacts, said insulating shields being mounted in and extending through said apertures and including an insulating bushing within the superstructure, said fixed disconnecting contacts being connected to busbars in said bus bar compartment and to electrical conductors in another of said compartments.

23. In metal clad switchgear including a supporting frame and a switch unit having disconnecting contacts vertically movable therein to connected and disconnected positions, a superstructure mounted on said frame comprising a shatterproof housing having an isolating partition for dividing the same into compartments including a bus bar compartment, said compartments having apertures in the bottom wall thereof on opposite sides of said partition, fixed disconnect contacts carried by the superstructure and cooperating with the movable contacts, and insulating shields surrounding the fixed disconnecting contacts, said fixed disconnecting contacts being connected to busbars in said bus bar compartment and to electrical conductors in another of said compartments and extending the circuit through the apertures.

24. In metal clad switchgear including a supporting frame and a switch unit having disconnecting contacts vertically movable therein to connected and disconnected positions, a superstructure mounted on said frame comprising a shatterproof housing having an isolating partition for dividing the same into compartments including a bus bar compartment, said compartments having apertures in the bottom wall thereof on opposite sides of said partition, and insulating shields supporting fixed disconnecting contacts, conductors mounted in the shields and extending from the fixed disconnecting contacts through said apertures and connected to busbars in said bus bar compartment and to electrical conductors in another of said compartments.

25. In an electric system, a plurality of metal clad switchgear each including a supporting frame and a switch unit having disconnecting contacts vertically movable therein to connected and disconnected positions and a superstructure mounted on said frame, comprising a unitary sheet metal housing having an isolating partition for dividing the same into compartments including a bus bar compartment, said compartments having apertures in the bottom wall thereof on opposite sides of said partition and said bus bar compartment provided with openings at opposite ends thereof, and insulating shields supporting fixed disconnecting contacts, said shields being mounted in and extending through said apertures, said fixed disconnecting contacts being connected to busbars in said bus bar compartment and to electrical conductors in another of said compartments, the respective switchgear being in alignment, the openings in the bus compartments of the adjacent switchgear being in communication, and the bus bars extending through the openings.

26. In metal clad switchgear including a supporting frame and a switch unit having disconnecting contacts vertically movable therein to connected and disconnected positions, a superstructure mounted on and overhanging said frame, comprising a unitary sheet metal housing having a metallic isolating partition for dividing the same into compartments, one of said compartments housing busbars and the other of said compartments housing current transformers and feeder cable connections, disconnecting contacts disposed on opposite sides of said partition for coacting with said movable disconnecting contacts, and supporting means for said feeder cable connections mounted in the overhanging bottom wall structure of said housing.

27. In metal clad switchgear including a supporting frame and a switch unit having disconnecting contacts vertically movable therein to connected and disconnected positions, a superstructure mounted on said frame comprising a shatterproof housing having an isolating partition for dividing the same into compartments, one of said compartments housing busbars and the other of said compartments housing current transformers and feeder cable connections, disconnecting contacts disposed on opposite sides of said partition for coacting with said movable disconnecting contacts, and feeder cables extending into the housing and terminating at said feeder cable connections.

28. In metal clad switchgear including a supporting frame and a switch unit having disconnecting contacts vertically movable therein to connected and disconnected positions, a superstructure mounted on said frame comprising a shatterproof housing having an isolating partition for dividing the same into compartments, one of said compartments housing busbars and the other of said compartments housing current transformers and feeder cable connections, and disconnecting contacts disposed on opposite sides of said partition for coacting with said movable disconnecting contacts.

29. In metal clad switchgear including a supporting frame and a switch unit having disconnecting contacts vertically movable therein to connected and disconnected positions, a superstructure mounted on said frame comprising a unitary sheet metal housing having an isolating partition for dividing the same into compartments, one of said compartments housing busbars and the other of said compartments housing current transformers and feeder cable connections, disconnecting contacts disposed on opposite sides of said partition and located below the bottom wall of said structure for coacting with said movable disconnecting contacts and establishing circuit connections between said movable disconnecting contacts and the busbars in said bus bar compartment and electrical conductors in another of said compartments, and supporting means for said feeder cable connections mounted in the wall structure of said housing.

30. In an electric system, a plurality of metal clad switchgear each including a supporting frame and a switch unit having disconnecting contacts vertically movable therein to connected and disconnected positions and a superstructure mounted on said frame comprising a unitary sheet metal housing having an isolating partition for dividing the same into compartments, one of said compartments housing busbars and the other of said compartments housing current transformers and feeder cable connections, disconnecting contacts disposed on opposite sides of said partition for coacting with said movable disconnecting contacts, and supporting means for said feeder cable connections mounted in the wall structure of said housing, the switchgear being adjacent one another and the bus bar compartments of the respective switchgears being in alignment and connected together to form a continuous chamber, the bus bars extending longitudinally through the connected bus compartments.

31. Superstructure for metal clad switchgear of the drop-down type including a supporting frame and a switch unit having disconnecting contacts vertically movable therein to connected and disconnected positions, comprising a unitary sheet metal housing having a metallic isolating partition for dividing the same into a busbar compartment and a current transformer compartment, fixed conducting means disposed in each of said compartments and establishing circuit connections through apertures in the bottom walls of said compartments with said movable disconnecting contacts, said busbar compartment having apertures in the side walls thereof for permitting inspection and extension of the busbars therein, removable cover members for said apertures, removable cover structure forming part of the top of said housing for permitting access to both of said compartments including the connections to the fixed conducting means and for permitting access to the current transformers and connections thereto in said transformer compartment.

32. Superstructure for metal clad switchgear of the drop-down type including a supporting frame and a switch unit having disconnecting contacts vertically movable therein to connected and disconnected positions, comprising a unitary sheet metal housing having a metallic isolating partition for dividing the same into a busbar compartment and a current transformer compartment, fixed conducting means disposed in each of said compartments and establishing circuit connections through apertures in the bottom walls of said compartments with said movable disconnecting contacts, said conducting means including fixed disconnecting contacts engageable by the movable disconnecting contacts, said bus bar compartment having apertures in the side walls thereof for permitting inspection and extension of the busbars therein, closures for said apertures, removable cover structure forming part of the top of said housing for permitting access to both of said compartments, including the connections to the fixed conducting means and for permitting access to the current transformers and connections thereto in said transformer compartment.

ALLEN M. ROSSMAN.

CERTIFICATE OF CORRECTION.

Reissue No. 19,797 December 24, 1935.

ALLEN M. ROSSMAN.

It is hereby certified that the name of the assignee in the above numbered patent was erroneously described and specified as "Rossman, Sargent & Lundy Patents Corporation, of Chicago, Illinois" whereas said name should have been described and specified as Rossman Engineering Company, a Corporation of Illinois, as shown by the records of assignments in this office; and that the said Letters Patent should be read with this correction therein that the same may conform to the record of the case in the Patent Office.

Signed and sealed this 18th day of February, A. D. 1936.

Leslie Frazer (Seal) Acting Commissioner of Patents.

ments of the respective switchgears being in alignment and connected together to form a continuous chamber, the bus bars extending longitudinally through the connected bus compartments.

31. Superstructure for metal clad switchgear of the drop-down type including a supporting frame and a switch unit having disconnecting contacts vertically movable therein to connected and disconnected positions, comprising a unitary sheet metal housing having a metallic isolating partition for dividing the same into a busbar compartment and a current transformer compartment, fixed conducting means disposed in each of said compartments and establishing circuit connections through apertures in the bottom walls of said compartments with said movable disconnecting contacts, said busbar compartment having apertures in the side walls thereof for permitting inspection and extension of the busbars therein, removable cover members for said apertures, removable cover structure forming part of the top of said housing for permitting access to both of said compartments including the connections to the fixed conducting means and for permitting access to the current transformers and connections thereto in said transformer compartment.

32. Superstructure for metal clad switchgear of the drop-down type including a supporting frame and a switch unit having disconnecting contacts vertically movable therein to connected and disconnected positions, comprising a unitary sheet metal housing having a metallic isolating partition for dividing the same into a busbar compartment and a current transformer compartment, fixed conducting means disposed in each of said compartments and establishing circuit connections through apertures in the bottom walls of said compartments with said movable disconnecting contacts, said conducting means including fixed disconnecting contacts engageable by the movable disconnecting contacts, said bus bar compartment having apertures in the side walls thereof for permitting inspection and extension of the busbars therein, closures for said apertures, removable cover structure forming part of the top of said housing for permitting access to both of said compartments, including the connections to the fixed conducting means and for permitting access to the current transformers and connections thereto in said transformer compartment.

ALLEN M. ROSSMAN.

CERTIFICATE OF CORRECTION.

Reissue No. 19,797 December 24, 1935.

ALLEN M. ROSSMAN.

It is hereby certified that the name of the assignee in the above numbered patent was erroneously described and specified as "Rossman, Sargent & Lundy Patents Corporation, of Chicago, Illinois" whereas said name should have been described and specified as Rossman Engineering Company, a Corporation of Illinois, as shown by the records of assignments in this office; and that the said Letters Patent should be read with this correction therein that the same may conform to the record of the case in the Patent Office.

Signed and sealed this 18th day of February, A. D. 1936.

Leslie Frazer (Seal) Acting Commissioner of Patents.